April 19, 1966   G. L. JENKINS   3,246,590
POWER ZOOM MECHANISM FOR MOVIE CAMERAS
Filed June 13, 1963   2 Sheets-Sheet 1

Gerald L. Jenkins
INVENTOR.
BY
ATTORNEY & AGENT

April 19, 1966    G. L. JENKINS    3,246,590
POWER ZOOM MECHANISM FOR MOVIE CAMERAS
Filed June 13, 1963    2 Sheets-Sheet 2

Gerald L. Jenkins
INVENTOR.
BY R. Frank Smith
Lloyd L. Seebach
ATTORNEY & AGENT

United States Patent Office 3,246,590
Patented Apr. 19, 1966

3,246,590
POWER ZOOM MECHANISM FOR MOVIE CAMERAS
Gerald L. Jenkins, Rochester, N.Y., assignor to Eastman Kodak Company, Rochester, N.Y., a corporation of New Jersey
Filed June 13, 1963, Ser. No. 287,721
11 Claims. (Cl. 95—45)

The present invention relates to a photographic camera having a zoom or pancratic lens, and more particularly to a mechanism in which at least one lens element of the taking lens system is moved axially in either direction by drive means independent of the camera motor.

In the prior art, photographic cameras having zoom lenses provide for moving the movable element of the lens system by means of a member which is coupled to the drive mechanism for moving the film strip past the exposure aperture. Such a system requires that a complex gear and linkage system be used in order to convert the unidirectional rotation of the camera motor to bi-directional movement of the lens element and the rate of movement of the movable lens element is dependent on the ratio of the drive coupling the movable lens element to the camera motor.

The present invention is disclosed in conjunction with a camera having a lens system comprising a number of lens elements with at least one of said lens elements being movable for varying the magnification of the lens system. The movable lens element is coupled to a member which can be moved in either of two directions by drive means independent of the camera motor and which can be varied in speed to obtain any desired rate of movement of the movable lens element. The mechanism disclosed and described herein provides not only a separate drive means for the movable lens element but also means for varying the speed of the drive means for the movable lens element independently of the camera motor.

The primary object of the invention is to drive the movable lens element of a zoom lens system in either axial direction by a variable speed drive means that is independent of the camera drive motor.

Another object of the invention is to provide a variable speed drive means for moving the movable lens element which is coupled to the lens element with the first portion of the movement of an actuating member in either of two directions and further movement of the actuating member in the same direction controls the speed of the drive means.

Still another object of the invention is to provide a mechanism in which a separate motor can be selectively coupled to a movable member for moving the movable lens element of a zoom lens system in either axial direction and at a variable rate of movement.

A further object of the invention is to provide an improved power zoom mechanism for a photographic camera.

Other objects and advantages of the invention will be apparent to those skilled in the art by the description of the invention hereinafter described. Reference is now made to the accompanying drawings wherein like reference numerals designate like parts and wherein.

Figure 1:
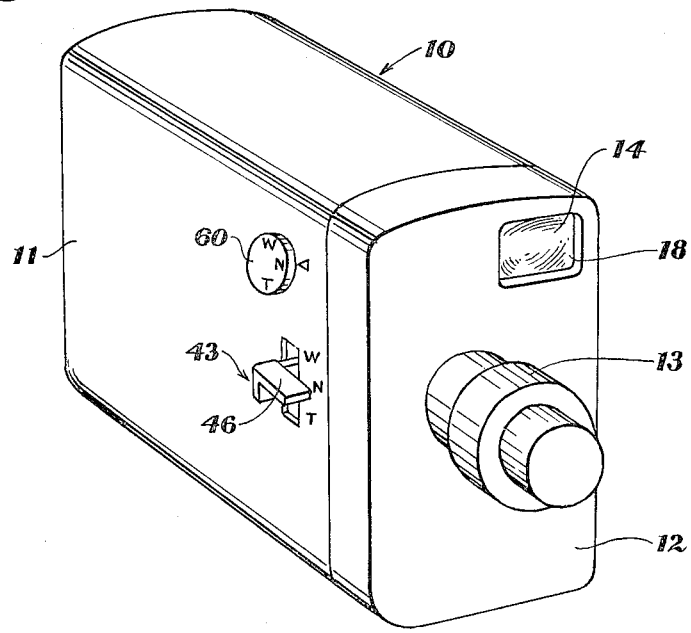
FIG. 1 is a perspective view of a camera embodying the invention.
Figure 3:
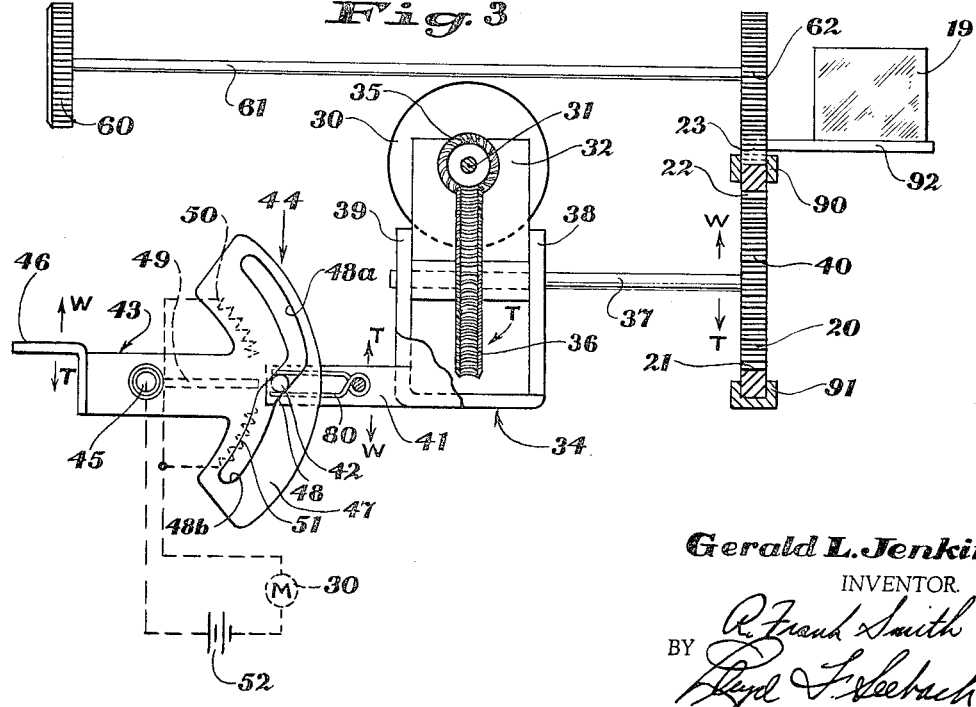
FIG. 3 is an elevation view of the drive mechanism showing the relation of the various elements thereof.
Figure 2:
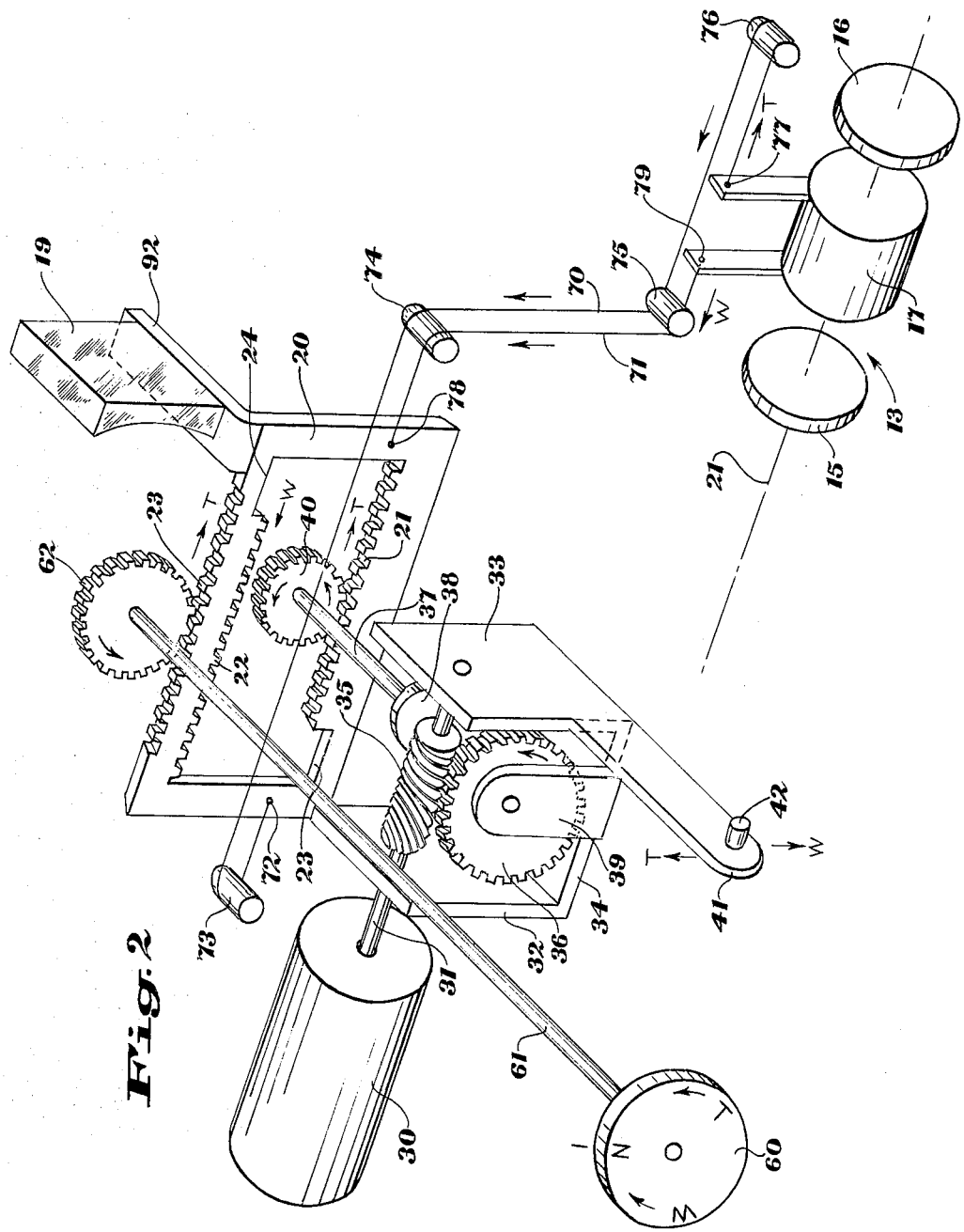
FIG. 2 is a perspective view of the drive means and the mechanism for moving the movable lens element of a zoom lens system in either axial direction.

With reference particularly to FIG. 1, the invention is embodied in a camera, designated generallly by the numeral 10, comprising a casing 11 having a front wall 12 on which a taking or objective lens system 13 is mounted in a well-known manner. The camera 10 can also be provided with a finder lens system generally indicated by the numeral 14. As shown in FIG. 2, the taking lens system 13 comprises fixed lens elements 15 and 16 and at least one movable lens element generally indicated by a numeral 17. Likewise, the finder lens system 14 can comprise a fixed element 18, an eyepiece, not shown, and a movable viewing lens element 19, as shown in FIGS. 2 and 3.

A movable member 20 is mounted within the casing 11 for movement in a longitudinal direction with respect to the optical axis 21 of the taking lens system 13. The member 20 is provided with a plurality of racks 21, 22 and 23 which are arranged within the frame forming member 20, as well as along one longitudinal edge thereof as shown in FIG. 2. Each of racks 21 and 22 is provided with an undercut portion 23 and 24 for a purpose to be described hereinafter.

As is well known in the art, the camera 10 can be provided with a motor that is either spring or battery operated for moving a film strip past an exposure aperture that is optically aligned with the lens elements of the taking lens system 13. Such a film advancing mechanism can be similar to that disclosed in U.S. Patent 1,960,062.

In the present invention, a motor 30 is mounted within casing 11 and can be a battery operated motor that is independent of the camera motor for advancing the film strip. As described hereinafter, such a motor can also be of a variable speed type. As shown in FIG. 2, the shaft 31 of motor 30 is journaled in the ends 32 and 33 of a bracket 34. A worm 35, which is secured to shaft 31, is arranged between ends 32 and 33 and engages a worm wheel 36 carried by a shaft 37 that is journaled in a pair of spaced ears 38 and 39 that are formed from the bracket 34. Worm 35 comprises a rotatable drive member that is a part of motor 30, and worm wheel 36 is driven thereby to rotate shaft 37 and a gear 40 fixed thereto and rotatable with worm wheel 36.

Bracket 34 is arranged so as to be movable about shaft 31 and an arm 41, which is formed as a part of bracket 34 and extends therefrom, carries a pin 42 which is positioned so as to be engaged by the actuating member 43, as shown in FIG. 3.

The manually operable control means 44 comprises the actuating member 43 and the bracket 34. The actuating means 43 is pivotally mounted within the camera casing 11 at 45 and comprises a fingerpiece 46 which is accessible from the outside of the camera casing as shown in FIG. 1. In addition, the actuating means 43 includes a portion 47 provided with a cam slot 48 which engages the pin 42 on arm 41. In addition, an arm 49 is movable with the actuating means 43 for connecting either a resistance 50 or 51 into series circuit with the motor 30 and a battery 52 depending on the direction of rotation of the actuating means by the fingerpiece 46.

A second manually operable means comprises a knob 60 which is mounted on the exterior of the casing 11 and which is fixed to one end of a shaft 61 that is suitably journaled within the camera casing and carries on the other end thereof a gear 62 which engages the rack 23, see FIGS. 2 and 3.

The movable member 20 is connected to the movable lens element 17 by cables 70 and 71. One end of cable 70 is fixed to member 20 at 72 and passes around the rollers 73, 74, 75 and 76 and has its other end secured to the movable lens element 17 at 77. The cable 71 has one end thereof fixed to member 20 at 78 and passes around rollers 74 and 75 with the other end fixed to movable lens element 17 at 79.

The actuating member 43 and the bracket 34 are maintained in a neutral position by means of a spring 80, as shown in FIG. 3. When these parts are in such a neutral position, the gear 40 is maintained in a position between racks 21 and 22 in which it is disengaged from both of these racks. At such a time, the knob 60 can be rotated in either direction, thereby rotating the gear 62 and by means of rack 23 moving the movable lens element 17 in either axial direction. The longitudinal movement of member 20 is transmitted by the cables 70 and 71 to the movable lens element 17. For example, when the member 20 is moved to the left for a wide angle effect (W), the distance between roller 74 and member 20 is increased so that the distance between roller 75 and the point 79 on movable lens element 17 must be decreased thereby moving the lens element to the left and in the same direction as the member 20. By the same token, the distance between member 20 and roller 73 decreases and this difference is taken up by the increase in distance between the point 77 on the movable lens element 17 and the roller 76. When member 20 is moved to the right by gear 62 for a telescopic effect (T), an opposite effect is obtained.

In order to obtain a wide angle effect which necessitates that the movable lens element 17 be moved toward the fixed element 15, the fingerpiece 46 is moved in an upward direction so as to rotate actuating means 43 in a clockwise direction. The very first portion of this movement results in interconnecting the camera motor to the film advancing mechanism and in the cam slot 48 and pin 42 moving the arm 41 of bracket 34 in a counterclockwise direction so that the worm wheel 36 is moved about the shaft 31 in a counterclockwise direction. With the movement of bracket 34 in this direction, the gear 40 is moved into engagement with the rack 22. Further movement of fingerpiece 46 in the same direction brings arm 49 into engagement with resistance 51 to energize motor 30, and assuming it drives gear 40 in a counterclockwise direction, the member 20 will be moved slowly to the left. By means of the cables 70 and 71, as described above, the movable lens element 17 will be moved axially towards the fixed element 15. While the central portion of cam slot 48 moves the gear 40 into engagement with rack 22, the arcuate extension 48a permits movement of the fingerpiece 46 to vary the position of arm 49 along resistance 51 and, at the same time, retains the gear and rack in engagement. With this further movement of the fingerpiece 46 along the variable resistance 51, the resistance is reduced, and thereby the speed of motor 30 is increased. With fingerpiece 46 in its maximum position, the arm 49 is beyond the resistance 51 so that the motor 30 is then rotating at its maximum speed to move lens element 17. As shown in FIG. 3, the movable member 20 can be guided for such longitudinal movement by means of the U-shaped guide members 90 and 91. Also, the movable finder lens element 19 is shown diagrammatically as being mounted on an arm 92 of member 20 so that said element moves together with the movable lens element 17 to vary the magnification of the viewfinding system.

When a telescopic effect is desired, the movable lens element 17 must be moved forward and toward the fixed element 16. This is accomplished when the fingerpiece 46 is moved in a counterclockwise direction and by means of cam slot 48 and pin 42 pivots bracket 34 and worm wheel 36 in a clockwise direction about shaft 31. During this first portion of the movement of fingerpiece 46, the film advancing mechanism is released and the gear 40 is moved into engagement with rack 21. Since the direction of rotation of gear 40 is counterclockwise, the member 20 is moved in a direction to the right. As described above, this movement of member 20 is transmitted to the movable lens element 17 by cables 70 and 71. Also, the speed of motor 30 is also varied by arm 49 which now engages the variable resistance 50 to increase the speed of motor 30 as fingerpiece 46 is moved further in a counterclockwise direction.

In both instances, whether fingerpiece 46 is moved in one direction or the other and then released, the spring 80 returns the fingerpiece 46 and bracket 34 to a neutral position in which gear 40 is disengaged from rack 21 and 22, as well as disabling the film advancing mechanism. The movable lens element 17 can be held positioned in any intermediate range between the fixed elements 15 and 16 by permitting spring 80 to return the fingerpiece 46 to the position in which motor 30 is disabled, but the camera motor is still enabled. When the fingerpiece is held in its maximum position, the gear 40 will run off of either rack 22 and into undercut 24 or off of rack 21 and into undercut 23. In either case, gear 40 has then imparted the maximum axial movement to movable lens element 17 and, upon movement of fingerpiece 46 in the opposite direction, the gear 40 is moved into engagement with the opposite rack and member 20 is then moved by gear 40 in the other axial direction.

It will be apparent from the above description that the movable lens element 17 can be moved in conjunction with operation of the camera by fingerpiece 46 or by means of knob 60 which will be independent of movement by the motor 30. Also, the movement of lens element 17 is not dependent on the speed of the camera motor but can be varied in accordance with the resistance placed in series with the motor 30 which is independent of the camera motor. It will also be obvious to those skilled in the art that the gear drive disclosed herein for interconnecting motor 30 to the movable member 20 can also be accomplished by a suitable friction drive with the same advantages and result. Since other modifications and changes in the embodiment of the invention disclosed and described herein will be apparent to those skilled in the art, the invention is not to be limited to this disclosure, but is of a scope as defined by the appended claims.

The embodiments of the invention in which an exclusive property or privilege is claimed are defined as follows:

1. In a photographic camera having a taking lens system including at least one axially movable lens element for varying the magnification thereof, and first drive means for moving a film strip past an exposure aperture aligned with said lens system, the combination comprising:

a movable member coupled to said lens element and having drive portions adapted to be selectively engaged for moving said lens element in a corresponding one of two axial directions;

second drive means; and manually operable control means including a first member driven by said second drive means and a second member driven by said first member, said control means being movable from a neutral position, in which said first and second drive means are disabled, in either of two directions for enabling said first drive means prior to said second drive means and for subsequently moving said second member into engagement with one of said drive portions to move said lens element.

2. A camera in accordance with claim 1 wherein said second drive means is a motor whose speed is increased upon movement of said control means in either of said two directions.

3. A camera in accordance with claim 2 including resistance means in series circuit with said motor for increasing the speed thereof, upon movement of said control means in either of said two directions.

4. A camera in accordance with claim 1 wherein said control means comprises an actuating member and a bracket for rotatably supporting said first member and said second member in an axially spaced relationship with said second member disposed adjacent the drive portions of said movable member and disengaged therefrom when said control means is in said neutral position.

5. A camera in accordance with claim 1 including a second manually operable control means directly coupled to said movable member for moving said lens element in either of said two axial directions independently of said second drive means.

6. In a photographic camera having a taking lens system including at least one axially movable lens element for varying the magnification thereof, and first drive means for moving a film strip past an exposure aperture aligned with said lens system, the combination comprising:

a movable member coupled to said lens element and having three spaced and parallel drive portions, two of which are adapted to be selectively engaged for moving said lens element in a corresponding one of two axial directions;
 second drive means;
 first manually operable control means pivotally mounted for movement about the axis of said second drive means and including a first member driven by said second drive means and a second member driven by said first member, said control means being movable from a neutral position, in which said first and second drive means are disabled, in either of two directions for enabling said first drive means prior to said second drive means and for subsequently moving said second member into engagement with one of said two drive portions to move said lens element; and
 second manually operable control means coupled to the third drive portion of said movable member for selectively moving said lens element in either of said two axial directions independently of said second drive means.

7. A camera in accordance with claim 6 wherein said second drive means comprises a variable speed motor including resistance means in series circuit with said motor for increasing the speed thereof, upon movement of said first control means in either of said two directions.

8. A camera in accordance with claim 6 wherein said first control means comprises an actuating member and a bracket coupled to said actuating member, said bracket rotatably supporting said first member and said second member in an axially spaced relationship with said second member disposed between said two drive portions and disengaged therefrom when said first control means is in said neutral position.

9. A camera in accordance with claim 6 wherein said second control means comprises a knob and a driving member in engagement with the third drive portion of said movable member for selectively moving said lens element in either of said two axial directions independently of said second drive means.

10. In a photographic camera having a taking lens system including at least one axially movable lens element for varying the magnification thereof, a viewing lens system including at least one axially movable viewing lens element for varying the magnification thereof, and means for moving a film strip past an exposure aperture aligned with said taking lens system, the combination comprising:

a movable member coupled to said lens element and to said viewing lens element and having drive portions adapted to be selectively engaged for moving said lens elements in a corresponding one of two axial directions;
 second drive means; and
 manually operable control means pivotally mounted for movement about the axis of said second drive means and including a first member driven by said second drive means and a second member driven by said first member, said control means being movable from a neutral position, in which said first and second drive means are disabled, in either of two directions for enabling said first drive means prior to said second drive means and for subsequently moving said second member into engagement with one of said drive portions to move said lens elements.

11. A camera in accordance with claim 10 including a second manually operable control means directly coupled to said movable member for moving said lens elements in either of said two axial directions independently of said second drive means.

References Cited by the Examiner
UNITED STATES PATENTS
3,095,794 7/1963 Raab _____ 95—45

JOHN M. HORAN, *Primary Examiner.*